(12) United States Patent
Lee

(10) Patent No.: US 9,374,674 B2
(45) Date of Patent: Jun. 21, 2016

(54) METHOD AND APPARATUS FOR RECOGNIZING INDOOR LOCATION USING RECEIVED SIGNAL STRENGTH INTENSITY MAP

(71) Applicant: Electronics and Telecommunications Research Institute, Daejeon (KR)

(72) Inventor: Yu-Cheol Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 101 days.

(21) Appl. No.: 14/207,508

(22) Filed: Mar. 12, 2014

(65) Prior Publication Data

US 2015/0195682 A1    Jul. 9, 2015

(30) Foreign Application Priority Data

Jan. 3, 2014    (KR) .................. 10-2014-0000579

(51) Int. Cl.
*H04W 24/00*    (2009.01)
*H04W 4/04*    (2009.01)

(52) U.S. Cl.
CPC ...................... *H04W 4/04* (2013.01)

(58) Field of Classification Search
CPC ....... H04W 64/00; H04W 4/028; H04W 4/04; H04W 4/025; H04W 16/20; H04W 64/003; H04W 4/008; H04W 4/02; H04W 4/023; H04W 4/021; H04W 40/20; H04W 4/022
See application file for complete search history.

(56) References Cited

U.S. PATENT DOCUMENTS

| | | | |
|---|---|---|---|
| 2010/0106745 A1 | 4/2010 | Cho et al. | |
| 2010/0121488 A1 | 5/2010 | Lee et al. | |
| 2011/0098923 A1 | 4/2011 | Lee | |
| 2012/0315918 A1* | 12/2012 | Kadous | H04W 4/021 455/456.1 |
| 2014/0018096 A1* | 1/2014 | Jagannath | H04W 4/021 455/456.1 |
| 2014/0194139 A1* | 7/2014 | Yang | G01S 5/0252 455/456.1 |
| 2014/0295878 A1* | 10/2014 | Yang | G01S 5/0252 455/456.1 |
| 2014/0335893 A1* | 11/2014 | Ronen | G01S 5/0252 455/456.1 |
| 2015/0018018 A1* | 1/2015 | Shen | H04W 4/04 455/457 |
| 2015/0172869 A1* | 6/2015 | Yang | H04W 4/028 455/456.1 |
| 2015/0230100 A1* | 8/2015 | Atia | H04W 16/18 370/252 |

FOREIGN PATENT DOCUMENTS

| | | |
|---|---|---|
| KR | 10-2010-0045355 A | 5/2010 |
| KR | 10-2011-0125333 A | 11/2011 |
| KR | 10-2013-0018000 A | 2/2013 |
| KR | 10-2013-0023433 A | 3/2013 |

* cited by examiner

*Primary Examiner* — Ajit Patel
(74) *Attorney, Agent, or Firm* — Rabin & Berdo, P.C.

(57) ABSTRACT

An apparatus for recognizing an indoor location using an RSSI (Received Signal Strength Intensity) map, includes an environment information acquirer configured to acquire indoor environment information and store the acquired indoor environment information on a node basis; a numerical map creator configured to create a numerical map; a field intensity creator configured to create the RSSI map; a dead-reckoning sensor configured to locate an area less than several meters within which the environment information acquire is actually located to locate a more accurate location within the area; a path information producer configured to produce path information including movable potential trajectories; and an initializer configured to initialize an initialization location of one or more candidate entities and fingerprint information.

20 Claims, 15 Drawing Sheets

FIG. 4

```
1   #X, Y, Theta, MacAddres, SSID, RSSI
2   1.251925, 44.254333, -1.531820, 2C36F9E8A102,, -52
3   1.251925, 44.254333, -1.531820, F81EDFFCCAED, LixWifi, 67
4   1.251925, 44.254333, -1.531820, 2C36F8E8A101,, -52
5   1.251925, 44.254333, -1.531820, 2C36F8E8A103,, -52
6   1.251925, 44.254333, -1.531820, 2C36F8439C24,, -67
7   1.251925, 44.254333, -1.531820, 2C36F8E8AAA4,, -54
8   1.251925, 44.254333, -1.531820, 2C36F8E8AAA2,, -54
9   1.251925, 44.254333, -1.531820, 2C36F8611104,, -65
10  1.251925, 44.254333, -1.531820, 2C36F8E8AAA1,, -54
11  1.251925, 44.254333, -1.531820, 00089FADBE30, jangcs_iptime, -65
12  1.251925, 44.254333, -1.531820, 2C36F8E8AAA3,, -54
13  1.251925, 44.254333, -1.531820, 2C36F8611101,, -63
14  1.251925, 44.254333, -1.531820, 2C36F8611103,, -63
15  1.251925, 44.254333, -1.531820, 00089FA91F3C, small room, -61
16  1.251925, 44.254333, -1.531820, 2C36F8E8A104,, -52
17  1.251925, 44.254333, -1.531820, 2C36F8439C21,, -67
18  1.251925, 44.254333, -1.531820, 2C36F8439C23,, -67
19  1.251925, 44.254333, -1.531820, 0025C41A1589, ETRO_11n, -49
20  1.251925, 44.254333, -1.531820, 2C36F8609581,, -92
21  1.251925, 44.254333, -1.531820, 2C36F8439C22,, -67
22  1.251925, 44.254333, -1.531820, 2C36F8609584,, -88
23  1.251925, 44.254333, -1.531820, F81EDFFCCC67,, -70
24  1.251925, 44.254333, -1.531820, 0025C41A1749, ETRO_11n, -52
25  1.251925, 44.254333, -1.531820, 00089FACD1D8, SUNServer, -73
26  1.251925, 44.254333, -1.531820, 2C36F80ECB44,, -74
27  1.251925, 44.254333, -1.531820, 2C36F80ECB42,, -78
28  6.238670, 43.605316, -0.068357, 2C36F8E8A104,, -51
29  6.238670, 43.605316, -0.068357, 2C36F8E8A102,, -50
30  6.238670, 43.605316, -0.068357, 00089FACD1D8, SUNServer, -67
```

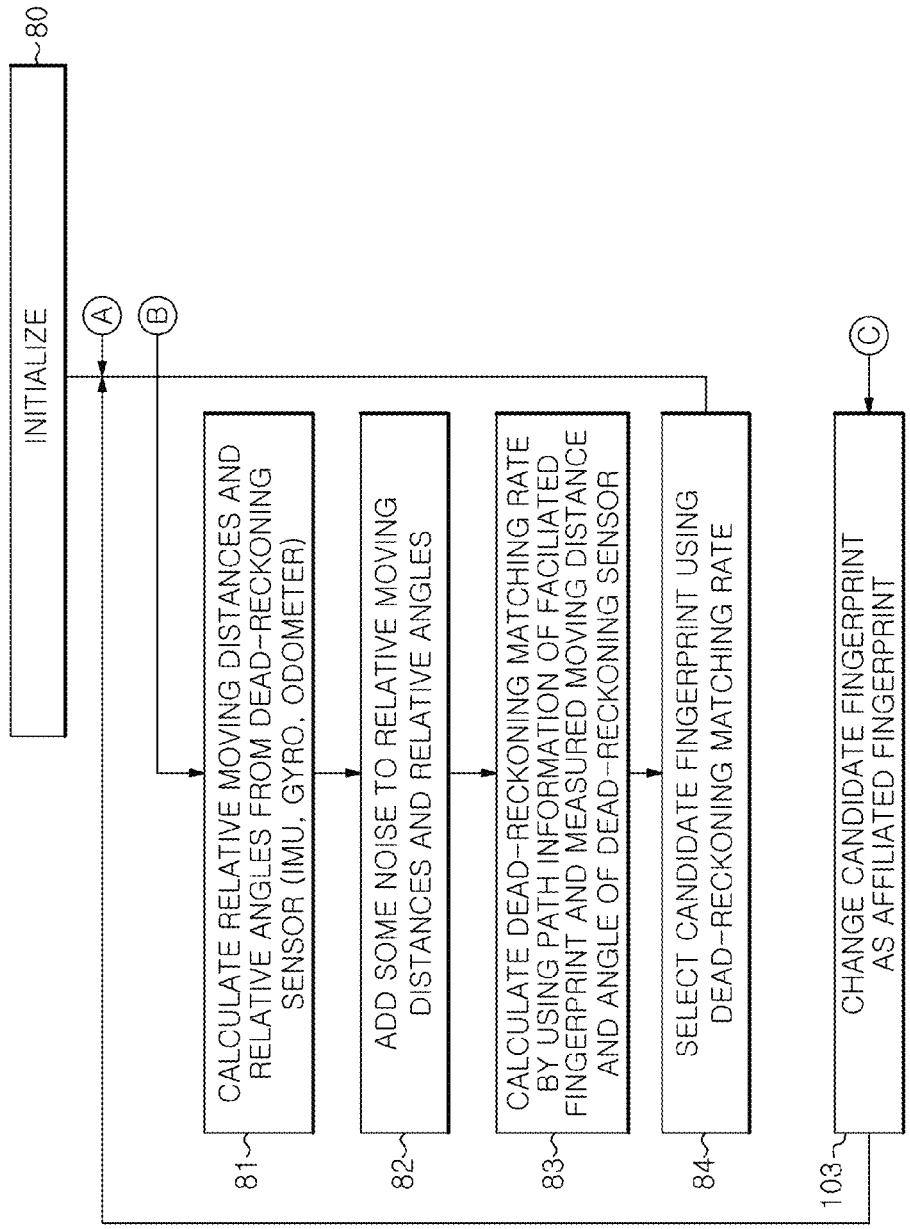

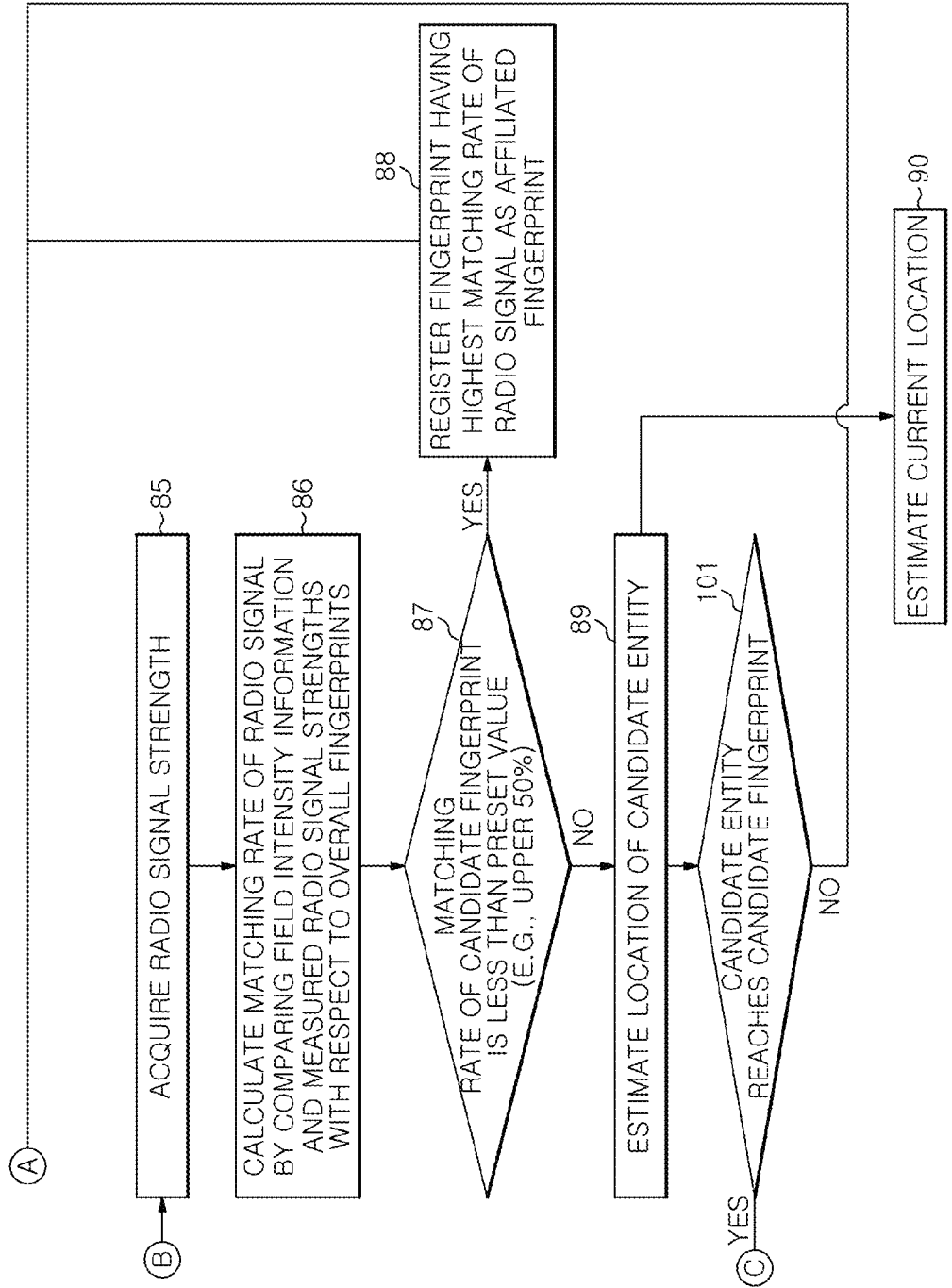

LOCATION OF CANDIDATE ENTITY
EXISTED FOR LONGEST TIME PERIOD =
CURRENT LOCATION

AVERAGE AND DISTRIBUTION OF
DISTRIBUTED LOCATIONS OF CANDIDATE ENTITIES =
CURRENT LOCATION

METHOD AND APPARATUS FOR RECOGNIZING INDOOR LOCATION USING RECEIVED SIGNAL STRENGTH INTENSITY MAP

CROSS-REFERENCE TO RELATED APPLICATION(S)

The present invention claims priority of Korean Patent Application No. 10-2014-0000579, filed on Jan. 3, 2014, which is incorporated herein by reference.

FIELD OF THE INVENTION

The present invention relates to a method and apparatus for estimating an accurate location in indoor space, and more particular, to a method and apparatus for accurately and rapidly creating an RSSI (Received Signal Strength Intensity) map of an indoor space and estimating an accurate location in the indoor space using the RSSI map.

BACKGROUND OF THE INVENTION

In recent, an indoor location recognition system has been utilized in numerous areas such navigation, warehouse management, patient management in hospitals, material management in factories, and others. Further, since the indoor location recognition system is possible to seek various applications, many researchers and developers have developed a variety of techniques in order to recognize an accurate indoor location.

Typical methods for recognizing an indoor location can be largely classified into a method based on triangulation using a physical distance and angel such as TDoA (Time Difference of Arrival), AoA (Angle of Arrival), ToA (Time of Arrival), etc. and a method based on the map to database the features of radio signals that characterize the locations. Moreover, the wireless devices used to measure the distance, angle, strength of the radio signals required for the position recognition of the indoor space mainly utilize a radio system such as Bluetooth, WLAN (Wireless LAN), Zigbee, UWB (Ultra-Wide Band), RF, Ultrasonic, Mobile (GSM/CDMA), and the like.

Although the method using a UWB device exhibits excellent accuracy, it has problems that it requires equipment that is specially designed for the indoor location recognition and the cost to build infrastructure to provide an indoor location recognition service to the public. In the case of using a mobile (e.g., GSM/CDMA) device for which infrastructure is well built, accuracy in the indoor location recognition is poor because of the nature that the base stations are not disposed densely. In a case of a method that utilizes Bluetooth, Zigbee, RF, Ultrasonic, or WLAN device, it is possible to develop a module for the indoor location recognition with a proper level (1~10 m or less) at a low cost. Therefore, this method is widely used in recognizing the indoor location.

In particular, by virtue of the development of mobile computing technology, an infrastructure of WLAN (IEEE 802.11) is also built well in an indoor space, similarly to the infrastructure of the mobile device. Therefore, in a worldwide enterprise and laboratories such as Microsoft, Nokia, Ekahau, etc. have continued to develop the technology relevant to the indoor location recognition. However, while the technology relevant to the indoor location recognition has been developed up to now, it is not enough to be commonly used in the general public. The reason is that the technology basically not only requires equipment that is specifically designed, but also needs to create in advance an RSSI map in which a database of the radio signal strength indication (RSSI) is built. Even if an indoor location recognition service provider creates the RSSI map in advance by investing the huge amount of money, the uncertainty depending on the dynamic environment due to the nature of the radio signals becomes a major obstacle when the technique is commonly used in real.

Accordingly, it is necessary to provide a method of creating an accurate indoor RSSI map that can be commonly used at low cost, and there is a need for ensuring that the RSSI map can be utilized for an accurate indoor location recognition by providing it to general users.

SUMMARY OF THE INVENTION

In view of the above, the present invention provides a method and apparatus for creating an RSSI map necessary for indoor location recognition in terms of improving rapidness and accuracy with a low cost to ensure that a user estimates an accurate location in an indoor space using the RSSI map by providing it to the user.

The object of the present invention is not limited thereto, and other entities that are not described above can be apparently understood by those skilled in the art from the following description.

In accordance with a first aspect of the present invention, there is provided an apparatus for recognizing an indoor location using an RSSI (Received Signal Strength Intensity) map. The apparatus includes an environment information acquirer configured to acquire indoor environment information and store the acquired indoor environment information on a node basis in the form of one package; a numerical map creator configured to create a numerical map that represents physical locations of surrounding objects that are present on a spatial structure or a space in numerical values using the indoor environment information acquired by the environment information acquirer; a field intensity creator configured to create the RSSI map which is map information in which received signal strength indication (RSSI) information measured from a wireless communication module is stored on a spatial location or area basis; a dead-reckoning sensor configured to locate an area less than several meters within which the environment information acquire is actually located through the use of the radio signal strength indication information and to locate a more accurate location within the area; a path information producer configured to produce path information which is information including movable potential trajectories when an arbitrary fingerprint moves to another fingerprint; and an initializer configured to initialize an start location of one or more candidate entities and fingerprint information that is affiliated to the candidate entities.

Further, the apparatus may further comprise a location estimator configured to estimate the location of the area less than several meters through the use of a matching between the measured radio signal strength information and the RSSI map information.

Further, the RSSI map may be created by zoning one or more nodes and merging the acquired environment information in the nodes into one fingerprint.

Further, the radio signal strength information may comprise one of MAC address, receiver signal strength indication (RSSI), SSID (Service Set IDentification).

Further, the merging may be performed by calculating an average or likelihood value of the radio signal strength information of which MAC addresses are same among the radio signal strength information using MAC address and the RSSI.

Further, the fingerprint includes location information that may be determined by interworking with the numerical map and the radio signal strength information that is acquired in the area.

Further, the dead-reckoning sensor may comprise one of IMU (Inertial Measurement Unit), Encoder, Odometer, Gyro, and Magnetometer.

In accordance with a second aspect of the present invention, there is provided a method for recognizing an indoor location using an RSSI (Received Signal Strength Intensity) map. The method includes initializing candidate entities; calculating relative moving distances and relative angles of the candidate entities from a dead-reckoning sensor; adding different noise values to the calculated relative moving distances and relative angles for the respective candidate entities; calculating a dead-reckoning matching rate using path information in accordance with information about affiliated fingerprint and information about a moving distance and angle of the read-reckoning sensor that is measured; selecting a candidate fingerprint using the calculated dead-reckoning matching rate; measuring strengths of radio signals; and calculating a matching rate of the radio signals by comparing among the strengths of the radio signals that are calculated with respect to all fingerprints in the RSSI map.

Further, the method may further comprise determining whether a matching rate of the candidate fingerprint that is affiliated to an arbitrary candidate entity is less than a preset value.

Further, the determining whether a matching rate of the candidate fingerprint is less than a preset value may comprise when the matching rate of the candidate fingerprint is less than the preset value, registering a fingerprint having the highest matching rate of the radio signal as the affiliated fingerprint; and setting the location of the registered fingerprint as the location of the candidate entity.

Further, the determining whether a matching rate of the candidate fingerprint is less than a preset value may comprise when the matching rate of the candidate fingerprint is above the preset value, estimating the location of the candidate entity as a current location.

Further, the method may further comprise determining whether the candidate entity reaches the candidate fingerprint.

Further, the determining whether the candidate entity reaches the candidate fingerprint may comprise when the candidate entity reaches the candidate fingerprint, setting the location of the candidate fingerprint as the location of the candidate entity and changing the candidate fingerprint into the affiliated fingerprint.

Further, the RSSI map may be created by zoning one or more nodes and merging the acquired environment information in the nodes into one fingerprint.

Further, the radio signal strength information may comprise one of MAC address, receiver signal strength indication (RSSI), SSID (Service Set IDentification).

Further, the merging may be performed by calculating an average or likelihood value of the radio signal strength information of which MAC addresses are same among the radio signal strength information using MAC address and the RSSI.

Further, the fingerprint may include location information and the radio signal strength information that is acquired in the area.

Further, the dead-reckoning sensor may comprise one of IMU (Inertial Measurement Unit), Encoder, Odometer, Gyro, and Magnetometer.

Further, the candidate entity may include the affiliated fingerprint information and location and direction information of the candidate entity.

With the configuration of the method and apparatus for recognizing an indoor location using the RSSI map in accordance with the embodiments, it is possible to reduce the complexity and uncertainty in radio signal information in an actual use and to estimate an accurate location through the combination of the RSSI map and the dead reckoning sensor.

The simultaneous creation of both the RSSI map and the floor plan map at the same time may contribute to the low cost, distribution, and diffusion of the indoor location recognition technology in light of the situations that it is possible to provide information related to the spatial structure, WLAN infrastructure for an indoor space is globally widespread with the development of mobile computing environment, a basic dead-reckoning sensor is widely used in the general public with the spread of smartphones and smart pads.

BRIEF DESCRIPTION OF THE DRAWINGS

The above and other objects and features of the present invention will become apparent from the following description of the embodiments given in conjunction with the accompanying drawings, in which:

FIG. 4 illustrates an exemplary diagram of an instance of basic information for fingerprints included in a RSSI map in accordance with an embodiment of the present invention;

FIGS. 8A and 8B are flow charts illustrating a method of recognizing an indoor location using a RSSI map in accordance with an embodiment of the present invention;

DETAILED DESCRIPTION OF THE EMBODIMENTS

Figure 1:
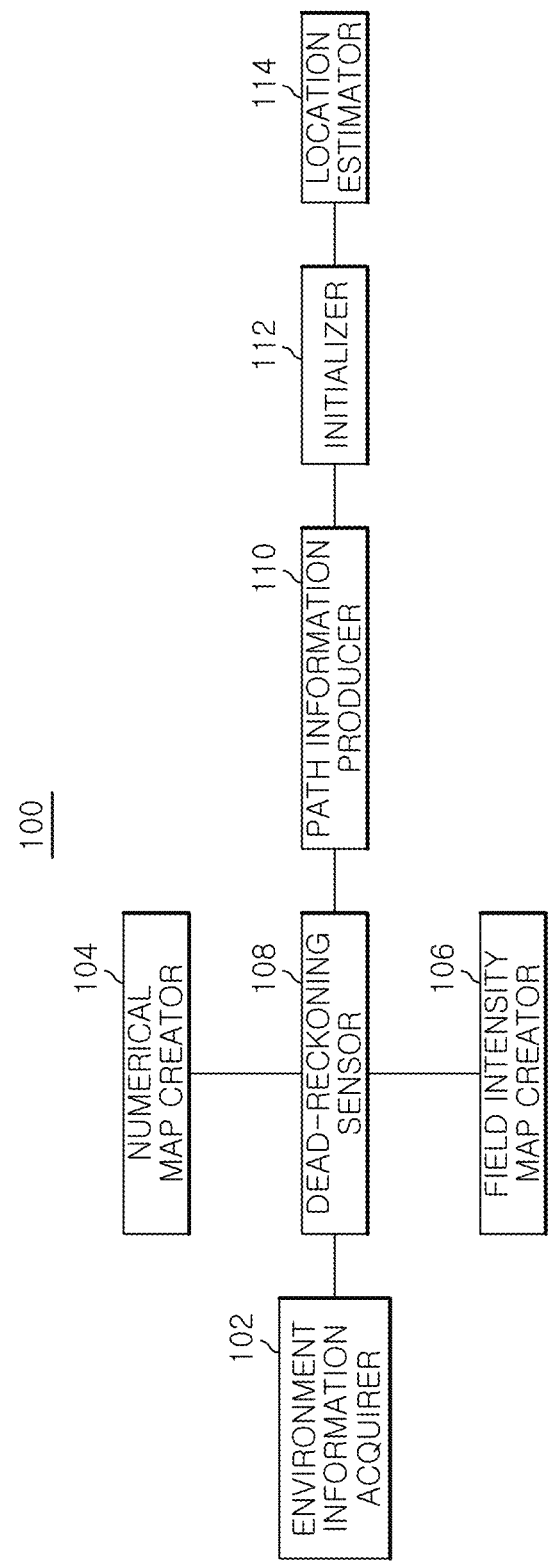
FIG. 1 is a block diagram of an apparatus for recognizing an indoor location in accordance with an embodiment of the present invention.

Advantages and features of the invention and methods of accomplishing the same may be understood more readily by reference to the following detailed description of embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims. Like reference numerals refer to like elements throughout the specification.

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms need to be defined throughout the description of the present invention.

Hereinafter, the embodiments of the present invention will be described in detail with reference to the accompanying drawings.

FIG. 1 is a block diagram of an apparatus for recognizing an indoor location in accordance with an embodiment of the present invention. An apparatus 100 for recognizing an indoor location may include an environment information acquirer 102, a numerical map creator 104, an RSSI (Received Signal Strength Intensity) map creator 106, a dead-reckoning sensor 108, a path information producer 110, an initializer 112, and a location estimator 114.

Referring to FIG. 1, the environment information acquirer 102 acquires indoor environment information such as locations of its peripheral objects, a current location of the environment information acquirer itself, radio signal strength, and the like. The acquired indoor environment information is stored on a node basis in one package type.

Figure 2:
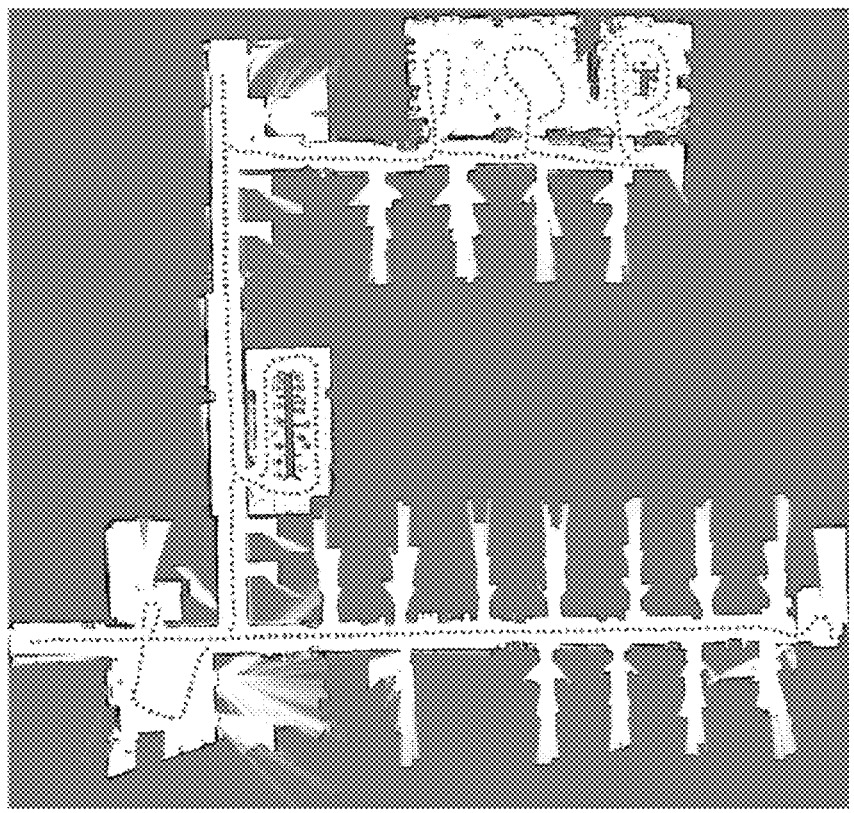
FIG. 2 is an exemplary diagram showing locations of nodes in which environment information acquired is stored in a numerical map in accordance with an embodiment of the present invention.

The numerical map creator 104 creates a numerical map, for example, a floor plan map that represents the physical locations of the peripheral objects, which are present on a spatial structure and space, as a numerical value using the acquired indoor environment information. The locations of the nodes in which the acquired indoor environment information is stored in the numerical map are exemplarily illustrated in FIG. 2. Therefore, it is possible to accurately recognize the locations of the acquired environment information included in the nodes.

Referring to FIG. 1 again, the RSSI map creator 106 creates a RSSI map which stores received signal strength indication (RSSI) that is derived from a wireless communication module on a spatial location basis or on a spatial region basis. In creating the RSSI map, it is possible to individually register and use node information at all locations as the locations of fingerprints, but it is more precise to use the node information as a location of one fingerprint by zoning several nodes and merging the environment information included in the several nodes.

The reason is as follows. Since the radio signal suffers from a distortion due to dynamic and static obstacles such as pedestrians, objects, walls received signal strength, accuracy of location information that can be distinguished by measuring the radio signal strength is only less than several meters. Thus, if information about a plurality of radio signals existed in an area less than several meters are merged, that is, an average of radio signal strengths is used, it is possible to reduce the percentage of error values in the radio signal strengths, thereby robustly defining information on radio signal strength characteristics in the area. According to the embodiment, the radio signal strength information of the nodes having the environment information included in a given area is merged into one fingerprint.

Figure 3:
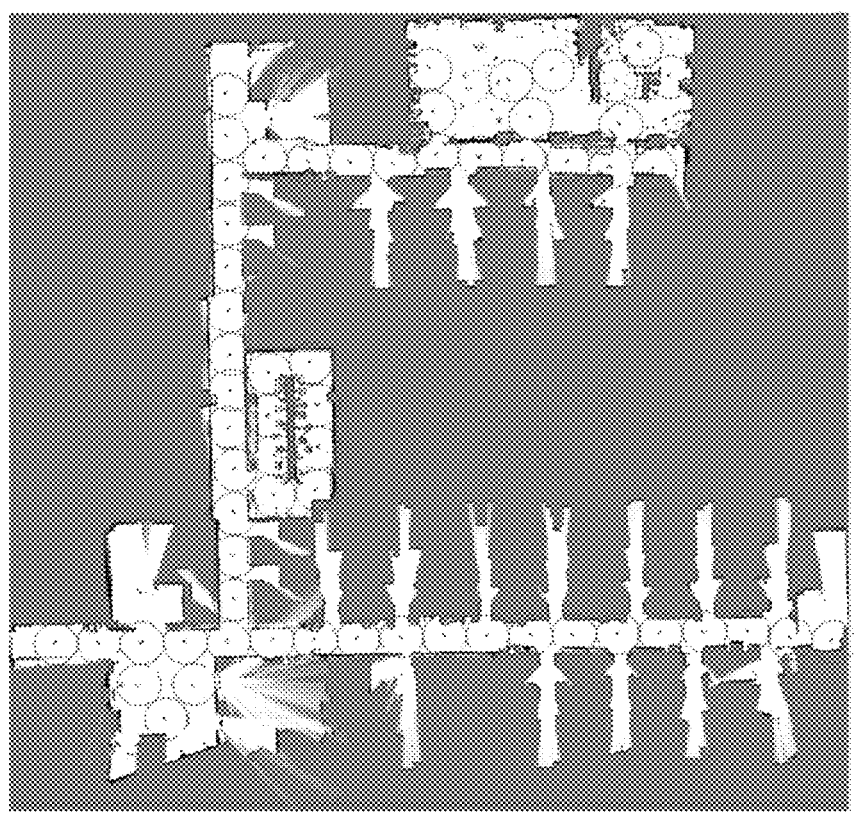
FIG. 3 depicts a conceptual diagram of an RSSI map information and fingerprints that have merged information on a given area basis in accordance with an embodiment of the present invention.

As an example, FIG. 3 depicts a conceptual diagram of RSSI map information and fingerprints in which several nodes are merged on a given area basis. A merging approach is to employ a MAC address and a received signal strength indication (RSSI). Specifically, the merging approach is performed by calculating an average or likelihood value of the RSSI of which MAC addresses are same among the radio signal strength information of the environment information nodes included in the given area.

FIG. 4 illustrates an exemplary diagram of an instance of basic information for fingerprints included in a RSSI map. Referring to FIG. 4, one fingerprint includes information such as location information that is determined by interworking with a numerical map and radio signal strength information acquired at the relevant area, e.g., MAC Address, RSSI (Received signal strength indication), SSID (Service Set IDentification), or the like.

Because a mapper of the RSSI map is able to create both the numerical map and a RSSI map at the same time by interworking them, it is possible for the mapper to rapidly make the RSSI map. Also, since the radio signal strengths can be calculated in detail in a given area, the accuracy of the radio signal strengths can also be enhanced. Further, the radio signal strengths that are collected in detailed are merged on a given area basis to form information for each fingerprint. Therefore, by utilizing the information for each fingerprint, it is possible to reduce uncertainty of the field intensity. This may be a solution to overcome the difficult to generally use the radio signals because of a random fluctuation in performance depending on weather, complexity of environment, and time.

Figure 5:
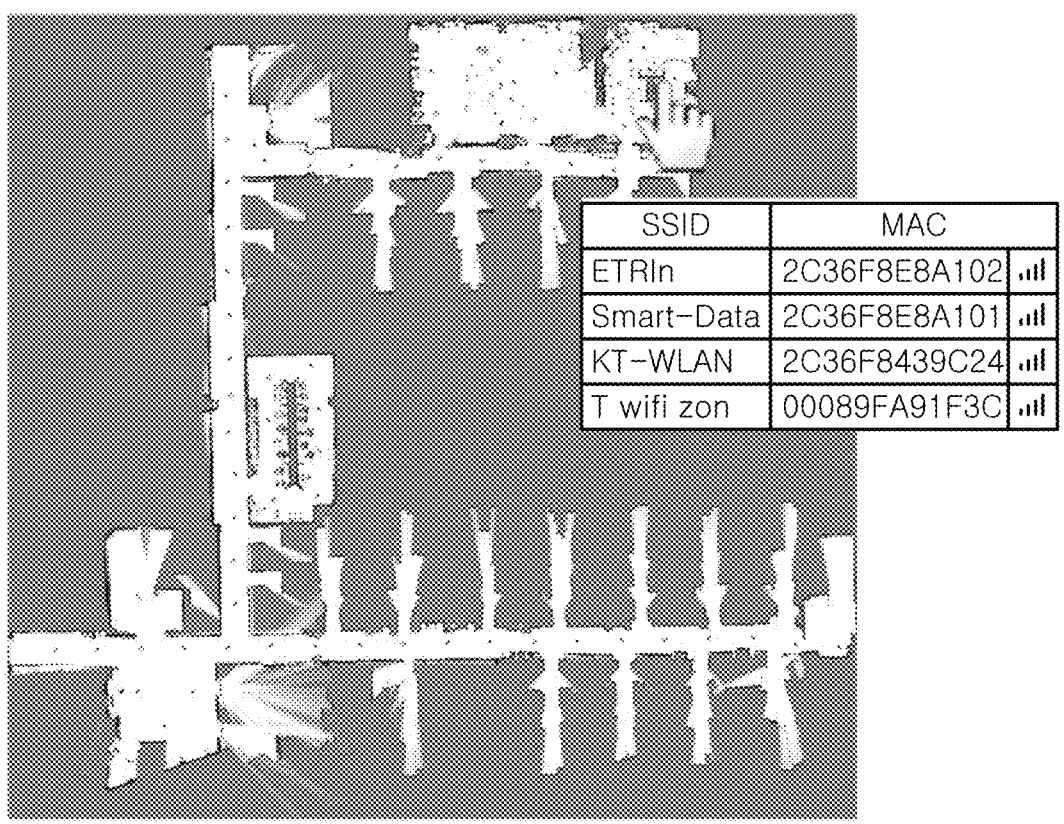
FIG. 5 is an exemplary diagram wherein a user inquires available wireless Internet information through a RSSI map at a remote location in accordance with an embodiment of the present invention.

The RSSI map that is created can be distributed in the format of a file to a general user who uses the indoor location recognition system along with the floor plan map. This shows that there is the potential for utilization of the field intensity as one piece of space infrastructure information. As an example, as illustrated in FIG. 5, a user can inquire available WIFI access points for connecting Internet through the RSSI map at a remote location.

Referring back to FIG. 1, the dead-reckoning sensor 108 locates an area less than several meters within which the environment information acquirer 102 is actually located through the use of the radio signal strength information and then accurately locates the location of the environment information acquirer 102 within the area. In order to more accurately locate the location, it is necessary to initialize candidate objects. The initialization of the candidate entities will be discussed later.

The path information producer 110 produces path information including movable potential trajectories of an entity when the entity moves from one fingerprint to another fingerprint in a space. The path information may be provided in the form of a map by calculating it for each fingerprint in advance depending on an algorithm used to extract the path information or may be obtained by the use of a location recognition module which is capable of calculating path trajectories moving from a current fingerprint to its neighboring fingerprints. Such an algorithm may vary with the numerical map standard. For example, an algorithm such as an A-star or the like may be employed in the numerical map of a raster format standard, and an algorithm such as an RRT or the like may be employed in the numerical map of a vector format standard.

The initializer 112 serves to initialize initial locations of the candidate entities and their fingerprint information that are affiliated to the candidate entities using the radio signal strength information.

The location estimator 114 estimates the location of an area less than several meters through the matching between the measured radio signal strength information and the RSSI map information. Once the initialization of the affiliated fingerprints of the candidate entities is done, the location estimator 114 may estimate more accurate location of the candidate entities by utilizing the dead-reckoning sensor 108 and map information.

Figure 6:
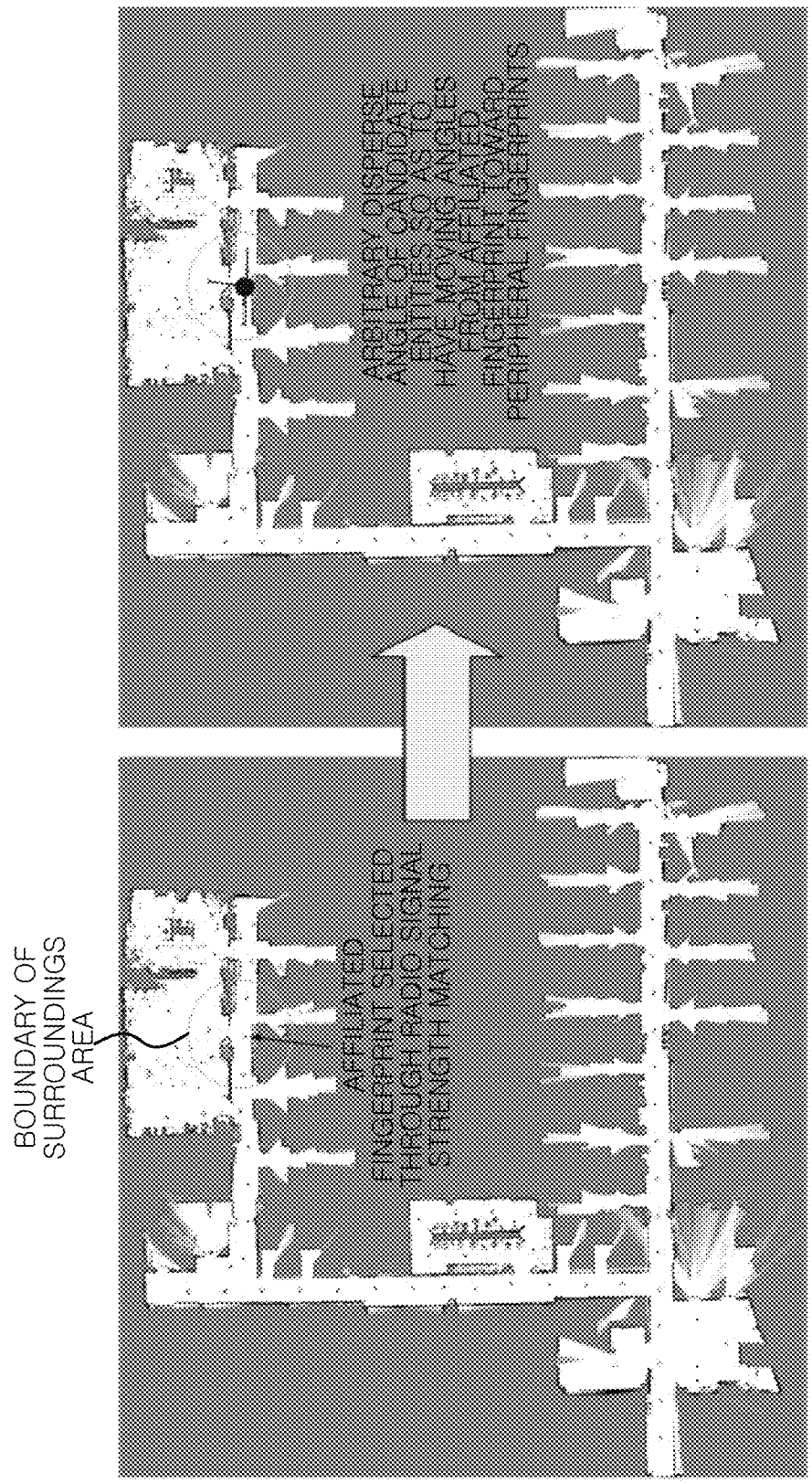
FIG. 6 illustrates an exemplary diagram of an instance of initializing candidate entity information through the matching between radio signal strength and a RSSI map in accordance with an embodiment of the present invention.

FIG. 6 is an exemplary diagram illustrating an instance of initializing candidate entity information through the matching between the radio signal strength and the RSSI map.

In particular, recently, a variety of dead-reckoning sensors such as IMU (Inertial Measurement Unit), Encoder, Odometer, Gyro, Magnetometer, or the like are mounted on smart phones/smart pads, robots, and the like by default. When a dead-reckoning sensor is used along with the RSSI map and the radio signal strength information, a more accurate indoor location can be estimated. According to the embodiment of the present invention, once the location of an area is obtained by using the radio signal strength information, a detailed location within the area can be estimated through the dead-reckoning sensor. A method using the radio signal strength may be employed to estimate an absolute location on the numerical map with an accuracy of several meter area. A method using the dead-reckoning sensor may be employed to estimate a relative location in a narrow area less than several meters, which is superior over the method using the radio signal strength in terms of accurate property.

Figure 7:
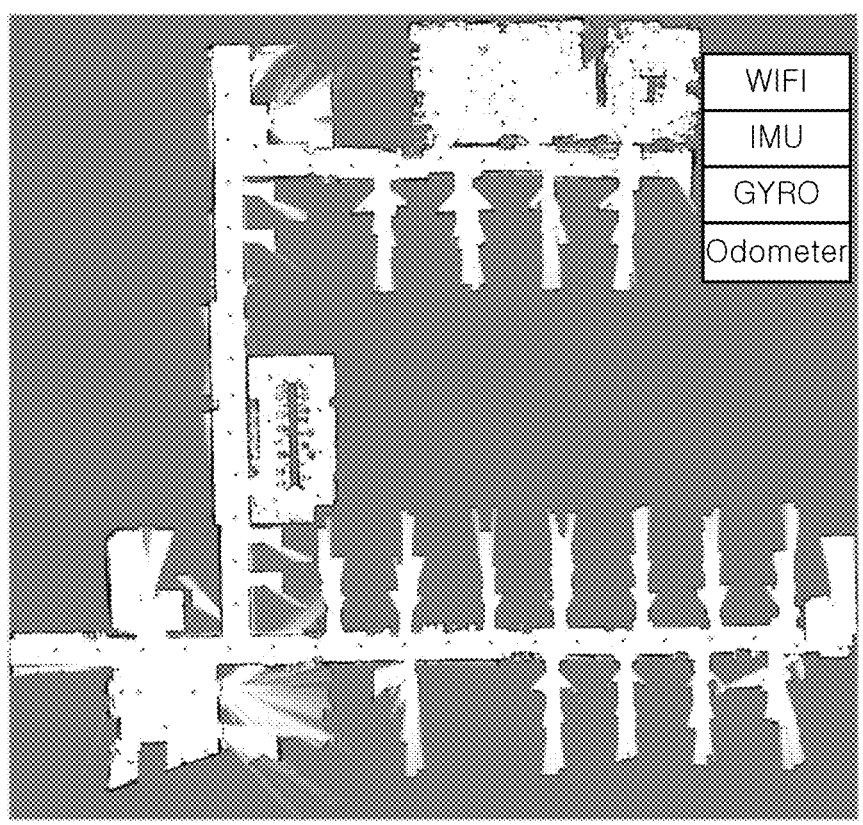
FIG. 7 illustrates an example of an exemplary screen for selecting a sensor to be used together with the RSSI map in accordance with an embodiment of the present invention.

FIG. 7 shows an example of an exemplary screen for selecting a sensor to be used together with the RSSI map. In the exemplary screen, a user can select the kind of dead-reckoning sensors that can be used in recognizing the indoor location and whether to use it or not, and a Wi-Fi related sensor is used by default.

FIGS. 8A and 8B are flow charts illustrating a method of recognizing an indoor location using the RSSI map.

Hereinafter, the description will be made on the method of recognizing an indoor location using the RSSI map.

First, candidate entities are initialized (Block 80). The initialization procedure of the candidate entities is performed independently for each candidate entity. A detailed initialization procedure of the candidate entities will be described with reference to FIG. 9.

Figure 9:
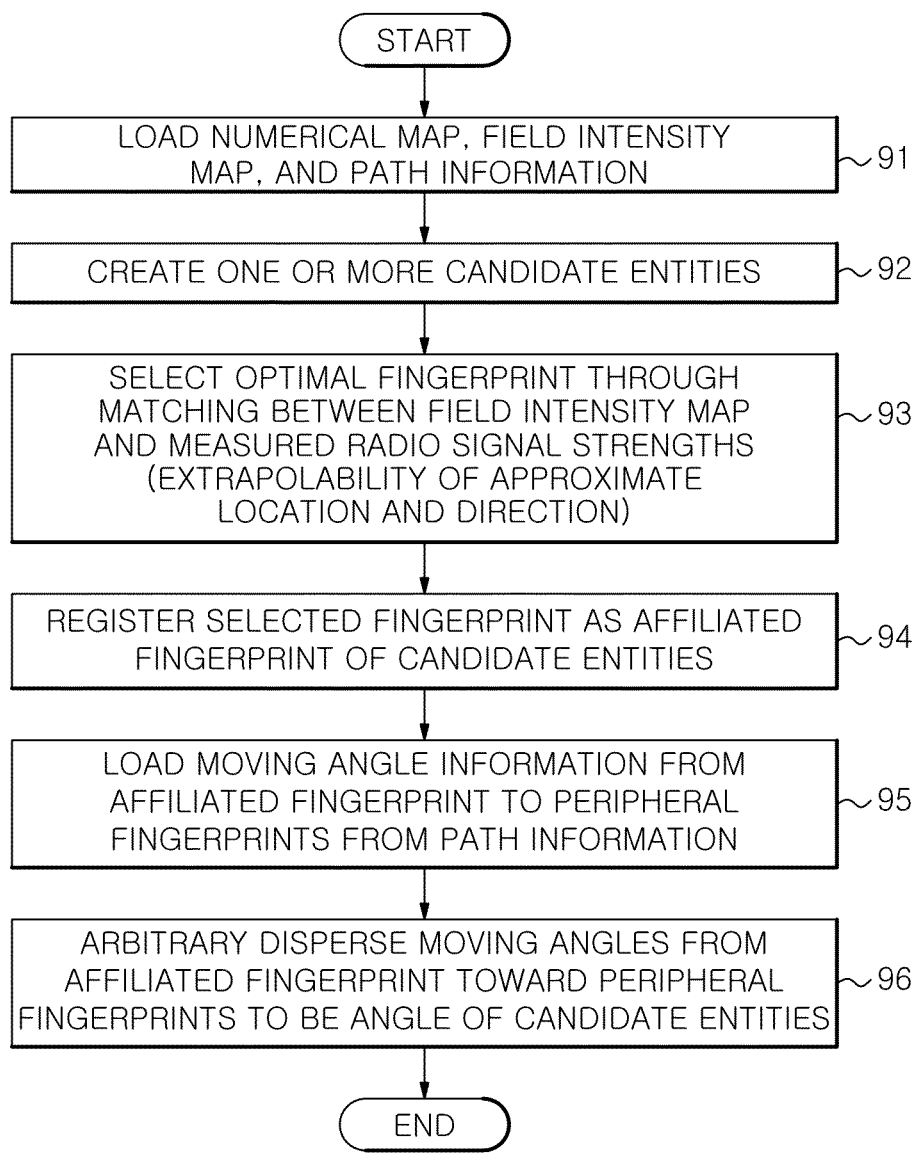
FIG. 9 is a flow diagram illustrating a process of initializing candidate entities in accordance with an embodiment of the present invention.

Referring to FIG. 9, the indoor location recognition apparatus 100 reads a numerical map, a RSSI map, and path information to load them thereon (Block 91).

In order to surely achieve the indoor location recognition, the indoor location recognition apparatus creates a plurality of candidate entities (Block 92). Each of the candidate entities includes fingerprint information that belongs to the candidate entity at present and location and direction information (e.g., X and Y coordinates, and an orientation angle) of the candidate entity.

Next, the indoor location recognition apparatus selects one fingerprint on the RSSI map that is best matched to the radio signal strength information that is measured at a starting point of time of an indoor location recognition module (Block 93), and then determines the selected fingerprint as an affiliated fingerprint that belongs to the plurality candidate entities (Block 94).

Thereafter, a candidate fingerprint is arbitrarily selected from among the affiliated fingerprint and its peripheral fingerprints and loads a moving angle needed to move from the affiliated fingerprint to the candidate fingerprint from the path information to set the moving angle as the angle of the candidate entities (Block 95).

Subsequently, moving angles from the affiliated fingerprint toward the peripheral fingerprints are arbitrarily dispersed to be allocated as the angle of the candidate entities (Block 96).

Referring to FIGS. 8A and 8B again, after the initialization of the candidate entities, the indoor location recognition apparatus calculates relative moving distances and relative angles of the candidate entities from the dead-reckoning sensor, for example, such as IMU, GYRO, Odometer, etc. (Block 81).

Next, some different noise or error values are added to the relative moving distance and relative angle of the candidate entities (Block 82). For example, 10% error value may be added to or subtracted from the relative moving distance and relative angle of a candidate entity 1, and 20% error value may be added to or subtracted from the relative moving distance and relative angle of a second entity 2.

More specifically, because of the different error values caused by the slipping or rolling depending on a real floor environment or the kind of the dead-reckoning sensor 108, a certain error is always included in the relative moving distance and relative angle. Thus, in order to use a value similar to a real value in recognizing the location, correction values corresponding to the different noise (or error) values are added for the respective candidate entities. The reason of applying the correction values corresponding to the different noise (or error) values for the candidate entity is unaware of a correct noise corresponding to the error. By increasing the number of the candidate entities, therefore, the possibility to which the noise value matching a real error is applied may be increased. Accordingly, it is preferable to estimate the location by increasing the number of candidate entities. In the implementation, the noise value to which ±1%, ±2%, ±5%, . . . , of a real moving distance and angle is applied may be used.

Next, a dead-reckoning matching rate is calculated by using the path information of the affiliated fingerprint and the measured moving distance and angle of the dead-reckoning sensor (Block 83).

More specifically, the moving distance and angle that are measured after the affiliated fingerprint is selected are calculated in order to calculate the dead-reckoning matching rate, and the calculated moving distance and angle are compared with motion information between the affiliated fingerprint acquired from the path information and the peripheral fingerprints.

Figure 10:
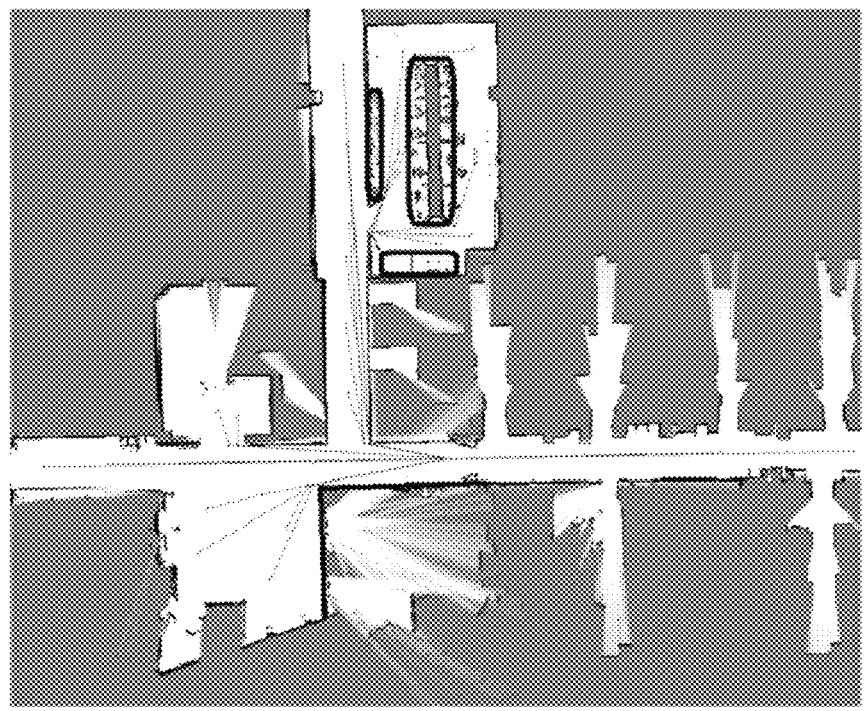
FIG. 10 depicts an exemplary diagram in which paths between fingerprints are created as motion information of path information extracted from a numerical map of a raster standard map which is a kind of the numerical map and the created paths are represented on the numerical map in accordance with an embodiment of the present invention.

FIG. 10 depicts an example in which paths between the fingerprints is created as motion information of the path information extracted from the numerical map of a raster format standard which is a sort of the numerical map and the created paths are represented on the numerical map. The path information may be provided in the form of file along with the numerical map and the RSSI map by calculating it in advance depending on the complexity and the amount of calculation of a path planning algorithm or may be calculated it in real time.

The dead-reckoning matching rate is calculated through the comparison moving path motion information to the peripheral fingerprints in accordance with the affiliated fingerprint information with the moving distance and angle that are measured by a real dead-reckoning sensor. The dead-reckoning matching rate may be used as an error value that is directly derived from the difference value between the path (motion) information and the measured moving distance/angle or a weight value that is calculated by substituting the Gaussian distribution for a given distance and angle with the difference value between the path (motion) information and the measured moving distance/angle.

Thereafter, a candidate fingerprint is set by using the calculated dead-reckoning matching rate (Block 84). In each candidate entity, the fingerprint having the highest dead-reckoning matching rate is set as a candidate fingerprint.

Subsequently, the radio signal strength is measured in order to update the location information of the candidate entity (Block 85), and the matching rate of the radio signal is calculated by comparing the field intensity information and the measured radio signal strengths with respect to the overall fingerprints in the RSSI map (Block 86).

After calculating the matching rate of the radio signal, it is determined whether the matching rate of the candidate fingerprint of the candidate entity is less than a preset value (e.g., an upper 50%) (Block 87). If the matching rate of the candidate fingerprint is less than the preset value, the fingerprint having the highest matching rate of the radio signal is registered as the affiliated fingerprint and the location of the fingerprint is set as the location of the candidate entity (Block 88). Subsequently, any one of fingerprints peripheral to the registered affiliated fingerprint is arbitrary selected as a candidate fingerprint of the candidate entity and a moving angle from the affiliated fingerprint to the candidate fingerprint is extracted from the path information to set it as an angle of the candidate entity.

Figure 11:
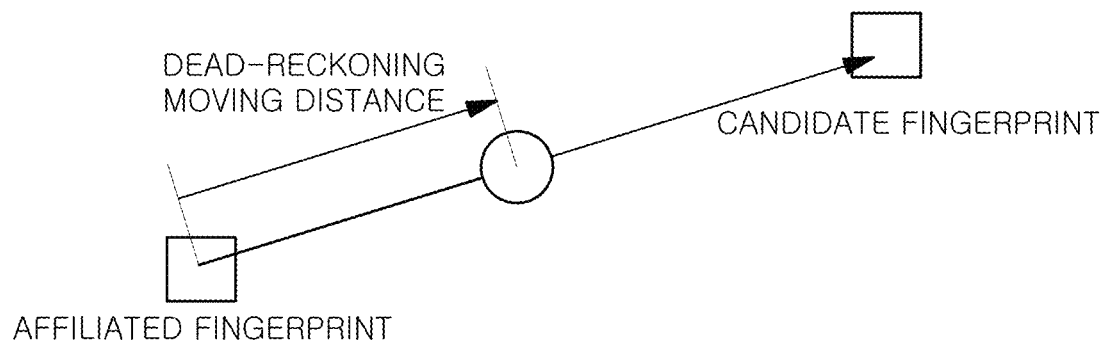
FIG. 11 shows how to estimate the location of a candidate entity in accordance with an embodiment of the present invention.

Meanwhile, if the matching rate of the candidate fingerprint is above the preset value, the location of the candidate entity is estimated (Block 89), and the estimated location of the candidate entity is estimated as a current location. In this connection, a way to estimate the location of the candidate entity is done by estimating as the location of the candidate object a point of the moving distance that is measured through the dead-reckoning on the moving path between the affiliated fingerprint of the candidate object and the candidate fingerprint, as illustrated in FIG. 11.

After that, it is determined whether the candidate entity reaches the candidate fingerprint (Block 101). If the candidate entity reaches the candidate fingerprint, the location of the candidate fingerprint is set as the location of the candidate entity and the candidate fingerprint is changed into the affiliated fingerprint (Block 103).

Meanwhile, however, as a result of the determination in Block 101, if the candidate entity does not reach the candidate fingerprint, the method returns to Block 81 to repeat the operations as set forth above.

Figure 12:
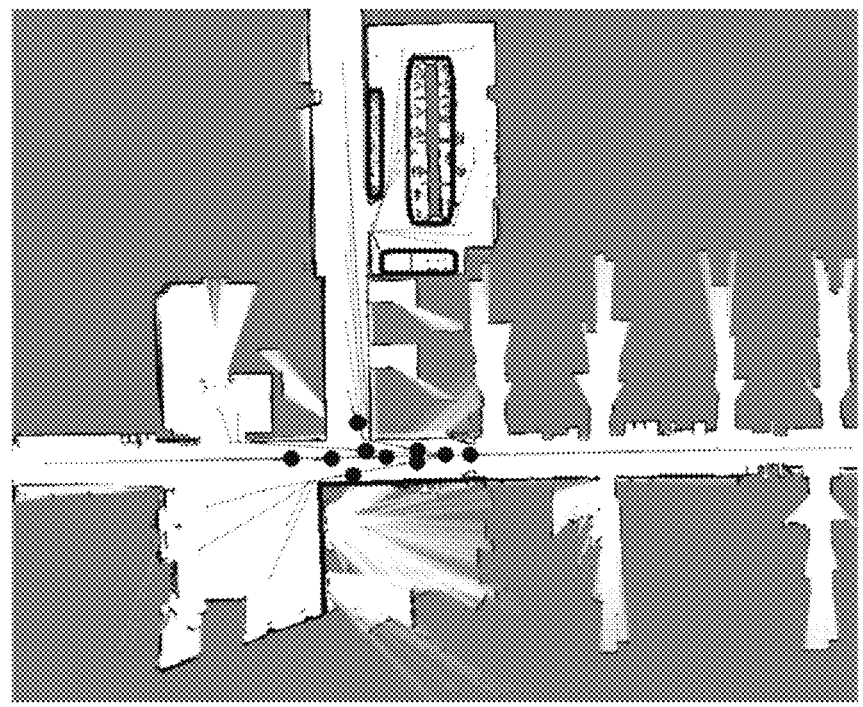
FIG. 12 is an exemplary diagram illustrating candidate entities that are scattered in accordance with an embodiment of the present invention.
Figure 13:
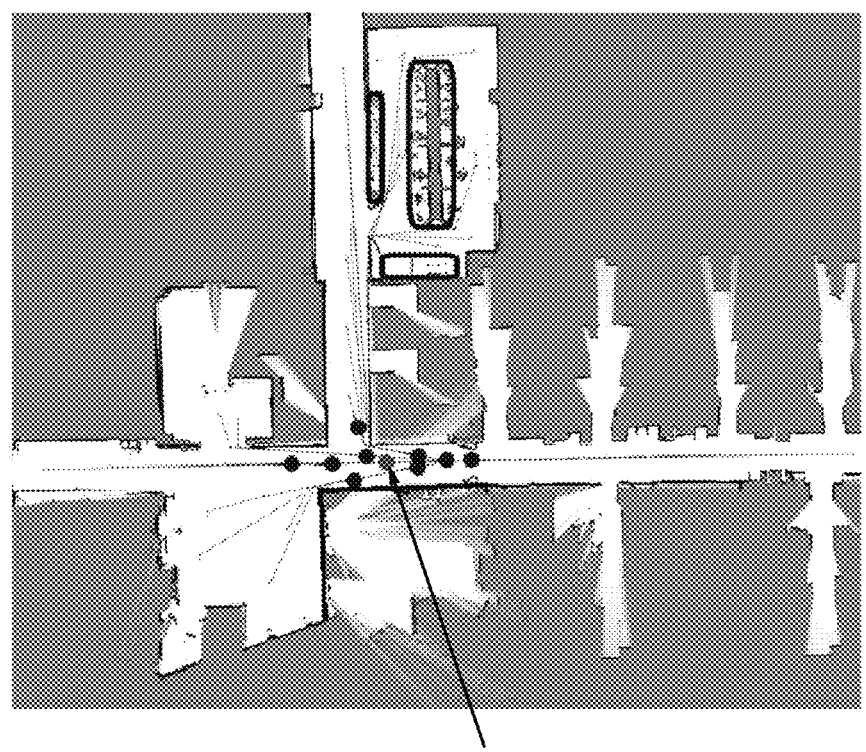
FIG. 13 is an exemplary diagram illustrating a process of determining a current location among a plurality of candidate entities in accordance with an embodiment of the present invention.
Figure 14:
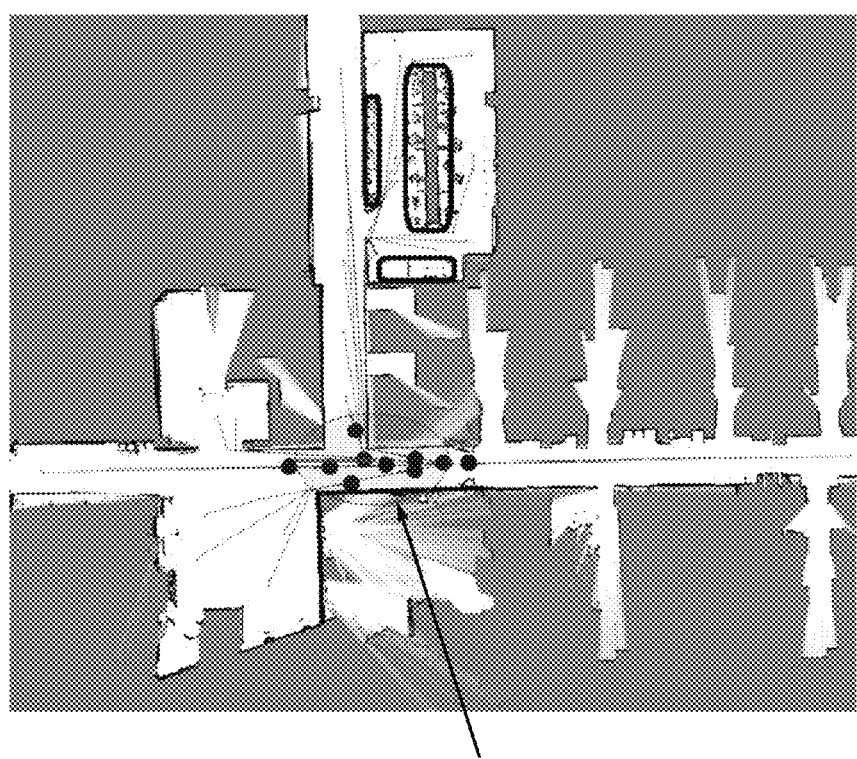
FIG. 14 shows an exemplary diagram illustrating a process of determining a current location as an averaged location of candidate entities in accordance with an embodiment of the present invention.

The calculated location and additional information (such as creation time) of the candidate entities are used to estimate the indoor location. As an example, when the candidate entities are scattered as illustrated in FIG. 12, a method to estimate the indoor location may be done by selecting the current location as the location of a candidate entity which has been existed (survived) for the longest time period among the candidate objects as illustrated in FIG. 13 or by taking the current location as an average of the locations of the candidate entities as illustrated in FIG. 14.

While the invention has been shown and described with respect to the embodiments, the present invention is not limited thereto. It will be understood by those skilled in the art that various changes and modifications may be made without departing from the scope of the invention as defined in the following claims.

What is claimed is:

1. An apparatus for recognizing an indoor location using a received signal strength indication (RSSI) map, the apparatus comprising:
   an environment information acquirer configured to
      acquire indoor environment information and
      store the acquired indoor environment information on a node basis in the form of a package;
   a numerical map creator configured to create a numerical map that represents physical locations of objects that are present in a structure or a space by numerical values using the acquired indoor environment information;
   a field intensity map creator configured to create the RSSI map, the RSSI map including RSSI information, which is measured by a wireless communication module and stored on a location or area basis;
   a dead-reckoning sensor configured to
   locate an area in which the indoor location recognition apparatus is located within a first degree of accuracy using the RSSI information, and
      locate the location of the indoor location recognition apparatus in said area within a second degree of accuracy that is greater than the first degree of accuracy;
   a path information producer configured to produce path information of the indoor location recognition apparatus, the path information including potential trajectories of the indoor location recognition apparatus moving from a first fingerprint to a second fingerprint in the RSSI map: and
   an initializer configured to initialize initial location of a candidate entity, and fingerprint information that is affiliated with the candidate entity, using the RSSI map, the candidate entity including a potential location of the indoor location recognition apparatus.

2. The indoor location recognition apparatus of claim 1, further comprising:
   a location estimator configured to estimate the location of said area within the second degree of accuracy using a matching between the RSSI information and the RSSI map.

3. The indoor location recognition apparatus of claim 1, wherein the field intensity map creator is further configured to create the RSSI map by zoning one or more nodes and merging the acquired environment information of the one or more nodes into one fingerprint.

4. The indoor location recognition apparatus of claim 3, the RSSI information comprises one of a media access control (MAC) address, a RSSI, and a service set identification (SSID).

5. The indoor location recognition apparatus of claim 4, wherein the field intensity map creator is further configured to merge the acquired environment information into said one fingerprint by calculating an average RSSI value or probable RSSI value from RSSIs in the RSSI information associated with the same MAC address.

6. The indoor location recognition apparatus of claim 4, wherein said one fingerprint includes location information that is determined by interworking with the numerical map and the RSSI information that is acquired in said area.

7. The indoor location recognition apparatus of claim 1, wherein the dead-reckoning sensor is an inertial measurement unit (IMU), an encoder, an odometer, a gyro, or a magnetometer.

8. A method for recognizing an indoor location of an apparatus using a received signal strength indication (RSSI) map having a plurality of fingerprints, the method comprising:
   initializing a location for each of a plurality of candidate entities;
   calculating displacements and angles of the candidate entities using a dead-reckoning sensor;
   correcting the calculated displacements and angles with noise or error values for the candidate entities;
   calculating a dead-reckoning matching rate using path information of a fingerprint affiliated with the apparatus and the corrected displacement and angle of the affiliated fingerprint;
   selecting a candidate fingerprint from among the fingerprints of the RSSI map using the calculated dead-reckoning matching rate;
   measuring strengths of radio signals to update the locations of the candidate entities: and
   calculating a matching rate of radio signals by comparing the strengths of the radio signals with respect to all fingerprints in the RSSI map.

9. The method of claim 8, further comprising:
   determining whether the calculated matching rate of the selected candidate fingerprint is less than a preset value.

10. The method of claim 9, further comprising:
    when the calculated matching rate of the selected candidate fingerprint is less than the preset value,
       registering a fingerprint among the fingerprints in the RSSI map having the highest calculated matching rate as the affiliated fingerprint, and
       setting a location of the registered fingerprint as the location of a candidate entity among the candidate entities.

11. The method of claim 9, further comprising:
    when the calculated matching rate of the selected candidate fingerprint is above the preset value, estimating the location of a candidate entity among the candidate entities as a current location.

12. The method of claim 11, further comprising:
    determining whether the candidate entity reaches the selected candidate fingerprint.

13. The method of claim 12, further comprising:
    when the candidate entity reaches the candidate fingerprint,
       setting the location of the selected candidate fingerprint as the location of the candidate entity, and
       changing the selected candidate fingerprint into the affiliated fingerprint.

14. The method of claim 8, further comprising:
    acquiring environment information of one or more nodes; and
    creating the RSSI map by zoning the one or more nodes and merging the acquired environment information of the one or more nodes into one fingerprint.

15. The method of claim 14, wherein the RSSI map comprises RSSI information, and
    the RSSI information comprises one of a media access control (MAC) address, a RSSI, and a service set identification (SSID).

16. The method of claim 15, wherein said merging comprises:
    calculating an average RSSI or probable RSSI value from RSSIs in the RSSI information corresponding to the same MAC address.

17. The method of claim 10, wherein the fingerprint includes location information and the RSSI information that is acquired in an area.

18. The method of claim 8, wherein the dead-reckoning sensor is a type of dead-reckoning sensor selected from among an inertial measurement unit (IMU), an encoder, an odometer, a gyro, or a magnetometer.

19. The method of claim 8, wherein each of the candidate entities includes fingerprint information, and location and direction information of the candidate entity.

20. The indoor location recognition apparatus of claim 1, wherein the acquired environment information includes an object that is present in said structure or said space, a location of the indoor location recognition apparatus, and RSSI.

* * * * *